US010459718B2

(12) United States Patent
Miller et al.

(10) Patent No.: US 10,459,718 B2
(45) Date of Patent: Oct. 29, 2019

(54) TECHNIQUES AND ARCHITECTURES FOR MAINTAINING METADATA VERSION CONTROLS

(71) Applicant: salesforce.com, inc., San Francisco, CA (US)

(72) Inventors: Michael Dwayne Miller, San Rafael, CA (US); James Bock Wunderlich, Burlingame, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 15/453,380

(22) Filed: Mar. 8, 2017

(65) Prior Publication Data

US 2018/0260211 A1 Sep. 13, 2018

(51) Int. Cl.
*G06F 9/44* (2018.01)
*G06F 8/71* (2018.01)
*G06F 8/53* (2018.01)
*G06F 8/41* (2018.01)

(52) U.S. Cl.
CPC ............... *G06F 8/71* (2013.01); *G06F 8/48* (2013.01); *G06F 8/53* (2013.01)

(58) Field of Classification Search
CPC ........................................................ G06F 8/71
See application file for complete search history.

(56) References Cited

U.S. PATENT DOCUMENTS

| | | | |
|---|---|---|---|
| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 6,092,083 | A | 7/2000 | Brodersen et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |
| 6,216,135 | B1 | 4/2001 | Brodersen et al. |
| 6,233,617 | B1 | 5/2001 | Rothwein et al. |
| 6,266,669 | B1 | 7/2001 | Brodersen et al. |
| 6,295,530 | B1 | 9/2001 | Ritchie et al. |
| 6,324,568 | B1 | 11/2001 | Diec |
| 6,324,693 | B1 | 11/2001 | Brodersen et al. |
| 6,336,137 | B1 | 1/2002 | Lee et al. |
| D454,139 | S | 3/2002 | Feldcamp |
| 6,367,077 | B1 | 4/2002 | Brodersen et al. |
| 6,393,605 | B1 | 5/2002 | Loomans |

(Continued)

*Primary Examiner* — Hang Pan
(74) *Attorney, Agent, or Firm* — Jaffery, Watson, Mendonsa & Hamilton, LLP

(57) ABSTRACT

Techniques and architectures for maintaining metadata version controls. A change to metadata within a computing environment is detected. Metadata subject to the change is decompiled into a source object that is in a format compatible with a version control system (VCS). The source object is stored in the VCS with relationship information to indicate a relationship to another source object, if the relationship is determined.

21 Claims, 5 Drawing Sheets

(56) References Cited

U.S. PATENT DOCUMENTS

| | | |
|---|---|---|
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshaysky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0135840 A1* | 7/2003 | Szabo ............... G06F 9/541 717/102 |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0177744 A1 | 7/2009 | Marlow et al. |
| 2012/0310875 A1* | 12/2012 | Prahlad ............ G06F 17/30539 707/602 |
| 2016/0092526 A1* | 3/2016 | Kothari ............ G06F 17/30563 707/602 |

* cited by examiner

TECHNIQUES AND ARCHITECTURES FOR MAINTAINING METADATA VERSION CONTROLS

TECHNICAL FIELD

Embodiments relate to techniques for managing metadata within a computing environment. More particularly, embodiments relate to techniques for using a version control repository to maintain metadata.

BACKGROUND

Metadata is generally data about other data. Metadata is often used to store and/or communicate characteristics about data. For example, data can be stored in a file having associated metadata (e.g., file size, creation date). As environments that use and operate on data become more complex, so too does the need for metadata as well as the amount of metadata that must be managed. Traditional techniques for managing metadata can include maintaining change logs to track and manage changes to the metadata. However, use of change logs can be unnecessarily complex and inefficient.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
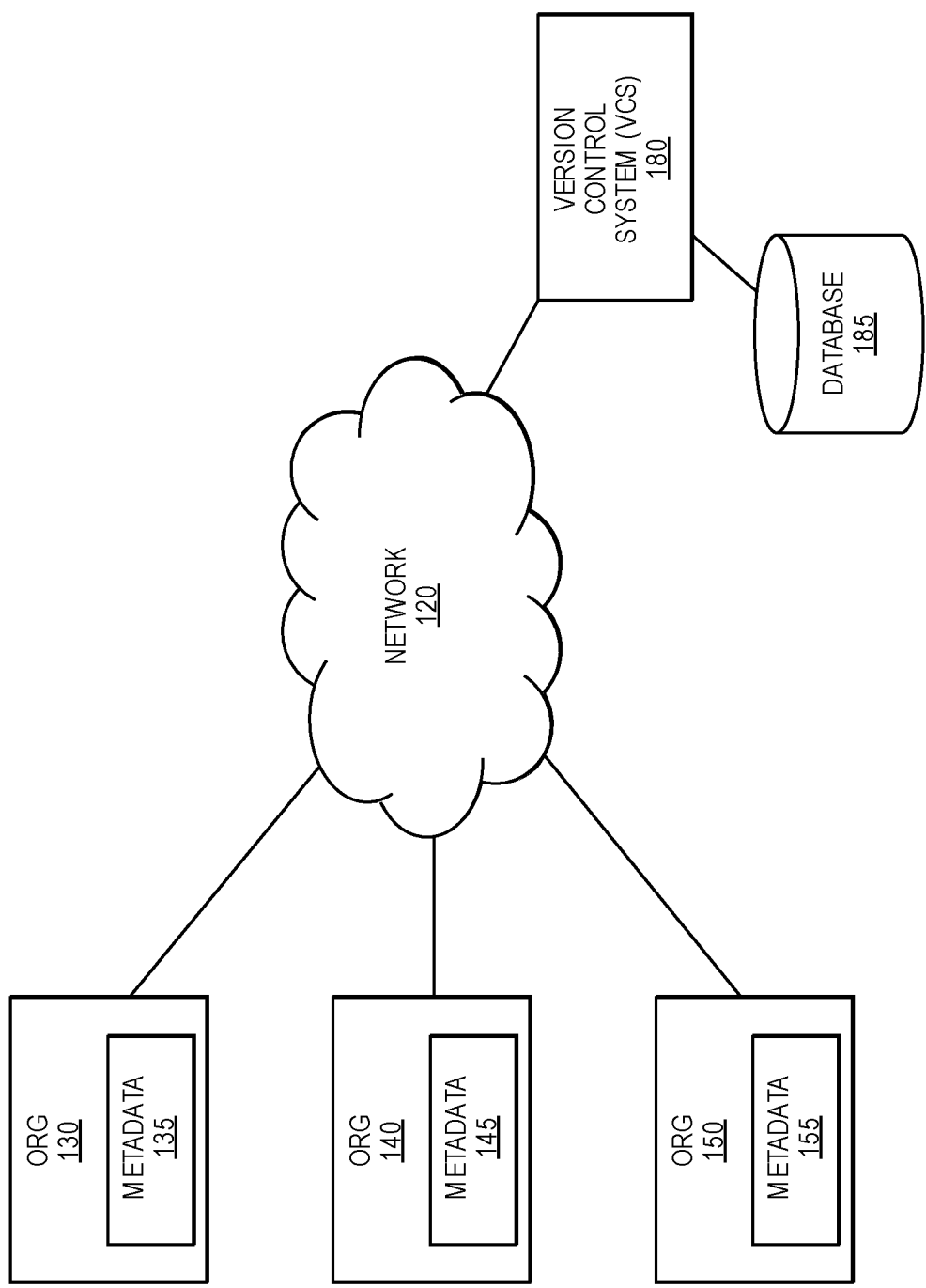
FIG. 1 is a block diagram of one embodiment an architecture that can be utilized to manage metadata using a VCS.

In the following description, numerous specific details are set forth. However, embodiments of the invention may be practiced without these specific details. In other instances, well-known structures and techniques have not been shown in detail in order not to obscure the understanding of this description.

Described herein are techniques and architectures to utilize a version control system (VCS) to track metadata changes. This can be utilized, for example, to synchronize metadata between organizations/tenants/customers in a multitenant environment, or to synchronize metadata between environments (e.g., development to production). In one embodiment, as metadata changes are logged and exported as events, the events can be "decompiled" and exported as "source" files (e.g., XML based human readable form) and these source files can be processed by the VCS system.

This can be used, for example, to synchronize changes within orgs and changes made outside the orgs through development or synchronization. For example, a change can be made external to the org and when the corresponding source change is committed, the VCS can trigger an update to the org metadata.

As used herein "decompiled" metadata is metadata and/or custom metadata (metadata about metadata) that is in a format that is manageable by a VCS. That is, the process of "decompiling" can cause the metadata to change forms from its native form to one that can be consumed and/or managed by the VCS. Further, "metadata" refers to any data that describes other data or metadata (e.g., custom metadata) and can include code. The term "source" object or "source" code or "source" file refers to objects/files having decompiled metadata and can take the form of, for example, text files, XML files, programming language files, APEX code, bytecode, etc. Conceptually, decompiling (or "deconstructing" or "reverse translation") is a reversal of creating metadata from a source, which can be considered a type of compilation (or construction or translation).

By "compiling" the metadata and treating it as "source" objects/files, the underlying metadata can be more easily managed and coordinated using a VCS, for example, Subversion (SVN) available from the Apache Software Foundation, Git available from Software Freedom Conservancy, or Concurrent Versions System (CVS) available from Free Software Foundation. Maintaining metadata in this way allows for more efficient and less error-prone uses of metadata. For example, a new org can be created with a selected version of metadata, metadata versions can be quickly and easily rolled back, etc.

This process of "decompiling" to generate "source" files/objects is fundamentally different than the traditional process of utilizing change logs or change sets. The use of change logs or change sets requires that the changes listed in the log/set be reapplied from a known starting point. In contrast, the techniques described herein allow for source files and/or objects to be compiled from the VCS to allow the desired version to be achieved without the process of rolling back and then reapplying changes.

FIG. 1 is a block diagram of one embodiment an architecture that can be utilized to manage metadata using a VCS. In the example of FIG. 1, multiple organizations/tenants/customers (orgs) are communicatively coupled with a version control system that has a sufficient storage capacity to store multiple versions of metadata for each org supported. Various architectures can be supported, for example, a multitenant, cloud-based architecture, an architecture in which the VCS services can be provided to multiple disparate orgs, an architecture in which the VCS manages metadata for one or more sub-groups within a single organization. Other and/or different configurations can also be supported.

In the example of FIG. 1, compiling (constructing, translating) corresponds to VCS-to-org traffic and decompiling (deconstructing, reverse translating) corresponds to org-to-VCS traffic. In one embodiment, the decompiling occurs in response to metadata a change in the org (tenant, customer). In one embodiment, the compiling is initiated by a database trigger; however, other triggers can also be supported. In one embodiment, the data from the metadata is compiled into a source readable form (e.g., XML). In one embodiment, deserialization occurs when a change is pushed from the VCS based on, for example, a trigger, or when a change is pulled from the VCS by the org.

Network 120 represents any interconnection between the other components of FIG. 1. Network 120 can be, for example, a local area network, the Internet, a bus structure within a computing system, etc. Network 120 provides the functionality of moving metadata (e.g., 135, 145, 155) between one or more orgs (e.g., 130, 140, 150) and version control system 180.

As various orgs (e.g., 130, 140, 150) function, metadata (e.g., 135, 145, 155) can be created or changed. In one embodiment, in response to creation or change to metadata, the host org (or component thereof) can decompile the metadata (or changes to the metadata) to be sent to VCS 180. In one embodiment, the org can provide the functionality of decompiling the metadata as described above. That is, the metadata (or changes to the metadata) can be converted to a format (e.g., XML file(s), text file(s), CSV files(s)) that is manageable by VCS 180.

In one embodiment, when metadata is modified, the host org determines what changes have been made to the metadata as well as any dependencies and/or supporting changes that have been (or should be) made along with the changes to the metadata. One or more source files (i.e., decompiled versions of any metadata that has been changed) are sent to VCS 180. In one embodiment, VCS 180 utilizes database 185 to store and manage versions of the source files.

Figure 2:
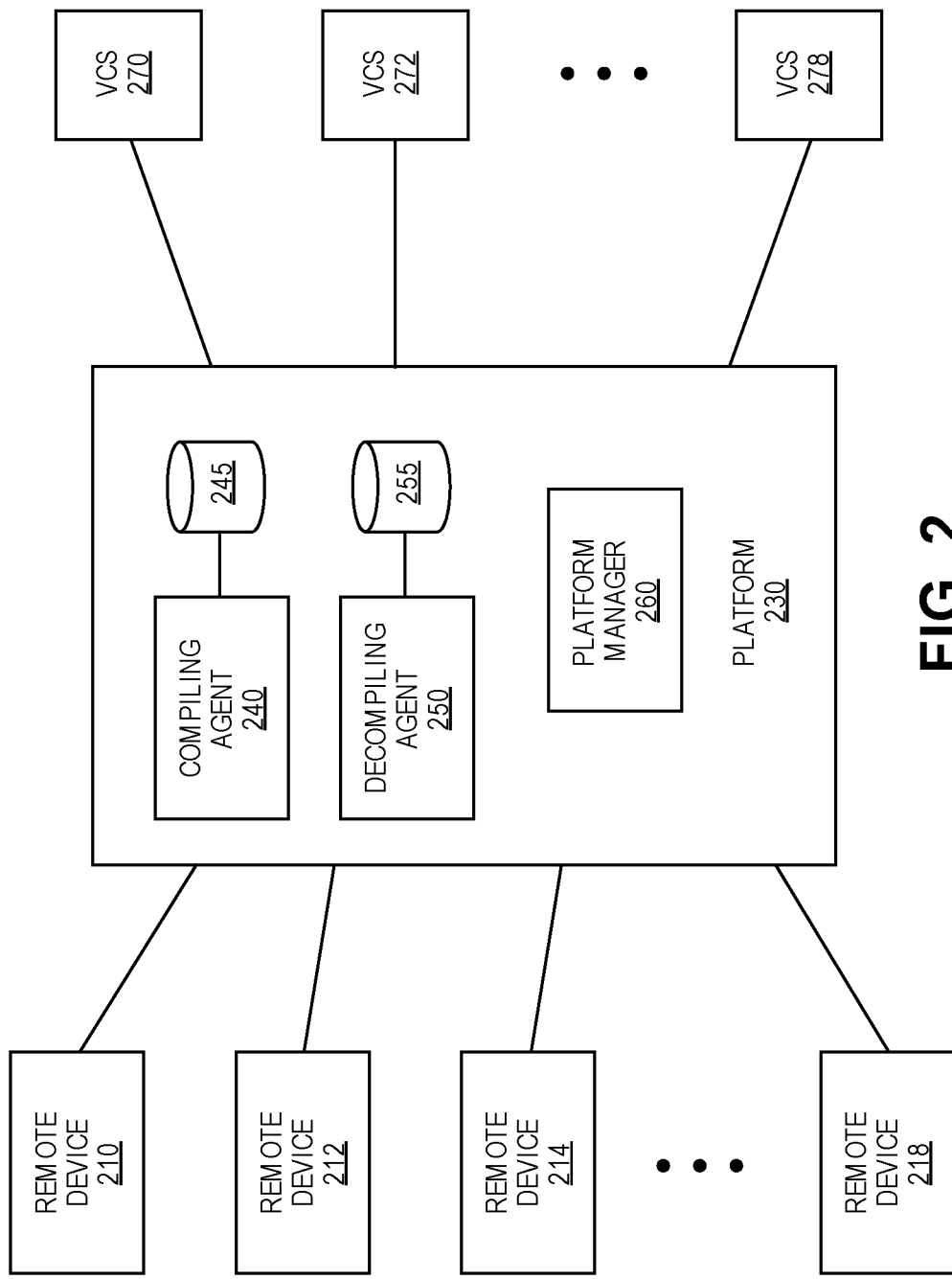
FIG. 2 is a block diagram of one embodiment of a shared platform that can utilize a VCS as described herein.

FIG. 2 is a block diagram of one embodiment of a shared platform that can utilize a VCS as described herein. The example of FIG. 2 corresponds to multiple tenants/organizations/customers sharing a platform, but each having their own VCS configurations.

One or more remote devices (e.g., 210, 212, 214, 218) can be utilized by users to access services provided by platform 230. The remote devices can be any type of electronic computing platform, for example, a laptop computer, a desktop computer, a tablet, a smartphone, a wearable computing device, a kiosk, etc.

Platform 230 can provide services (e.g., Customer Relationship Management, shared database(s), inventory tracking, social media) to the one or more remote devices. In various embodiments, in order to provide services to multiple devices and/or multiple tenants/organizations/customers, metadata may be utilized to provide customizations. The customizations can be made, for example, by users of the remote devices. Platform 230 can be any number of physical computing devices.

In one embodiment, each tenant/organization/customer can have their own VCS (e.g., 271, 272, 278) for use with files specific to the tenant/organization/customer. Different tenants/organizations/customers can have different VCS implementations. Thus, the files and corresponding formats may vary from VCS to VCS.

In one embodiment, platform 230 includes compiling agent 240 and decompiling agent 250. In one embodiment, compiling agent 240 and decompiling agent 250 are shared by one or more (or all) of the tenants/organizations/customers of platform 230. In one embodiment, compiling agent 240 has access to data store 245 that includes configuration information for the one or more VCS implementations that are supported. In one embodiment, decompiling agent 250 has access to data store 255 that includes configuration information for the one or more VCS implementations that are supported. Compiling agent 240 and decompiling agent 250 can provide the compiling and decompiling functionality described herein.

In one embodiment, platform manager 260 supports or provides the functionality provided by platform 230. As discussed above, platform 230 can provide a variety of services and functionality to any number of tenants/organizations/customers using one or more remote devices.

Figure 3:
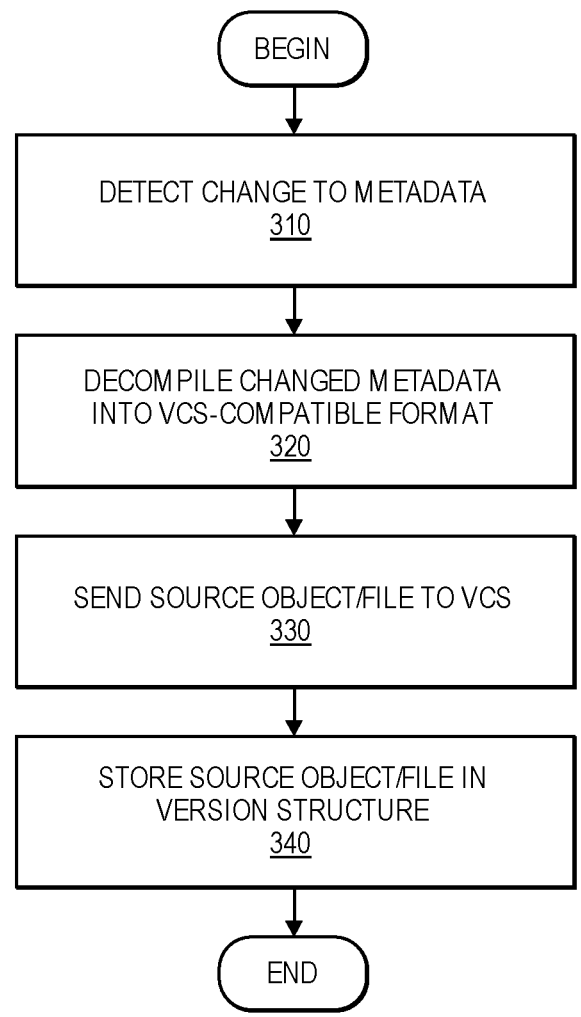
FIG. 3 is a flow diagram of one embodiment of a technique for managing metadata using a VCS.

FIG. 3 is a flow diagram of one embodiment of a technique for managing metadata using a VCS. The techniques of FIG. 3 can be provided, for example, by the components illustrated in FIG. 1, one or more of which can be part of an on-demand services environment, various embodiments of which are described in greater detail below with respect to FIGS. 4 and 5. Some embodiments can operate in a multitenant environment to provide support to multiple organizations/tenants/customers by sharing resources such as a database.

Changes to metadata can be detected, 310. Various techniques can be utilized to determine whether a change has occurred. In one embodiment, when a change has been saved to an object or file, the technique of FIG. 3 can be triggered. In another embodiment, the technique of FIG. 3 can be explicitly triggered (e.g., through a command or graphical user interface menu or button) by a user (e.g., developer). As another alternative, metadata file comparisons can be performed at pre-selected intervals.

The detected changes are decompiled into a VCS-compatible format, 320. This results in source objects/files that can be stored and managed with the VCS. As discussed above, the decompiled objects/files can be, for example, text files, XML files, programming language files, APEX code. In one embodiment, the process of decompiling the metadata includes providing linking and/or relationship information to indicate relationships between decompiled objects/files, if appropriate.

The source objects/files are sent to the VCS, 330. In one embodiment, this may include transmitting the source objects/files over a network from the environment in which the metadata has been changed to a remote VCS. In another embodiment, the environment in which the metadata has been changed and the VCS are part of an integrated platform.

The VCS stores the source objects/files in the appropriate structure, 340. In one embodiment, the VCS provides relationship and/or dependency information in the storage structure or in the versioning information to indicate relationships between decompiled objects/files, if appropriate.

The source objects/files stored in the VCS can be used for rolling back to previous versions of the metadata by extracting the source objects/files from the VCS. Comparison analysis can also be performed on the source objects/files in the VCS. Techniques for rolling back, or undoing, changes to metadata are described in greater detail in U.S. patent application Ser. No. 15/453,645, entitled "TECHNIQUES AND ARCHITECTURES FOR PROVIDING FUNCTIONALITY TO UNDO A METADATA CHANGE" by James Bock Wunderlich, filed concurrently herewith, which is incorporated by reference herein.

As used herein, a "tenant" includes a group of users who share a common access with specific privileges to a software instance. A multi-tenant architecture provides a tenant with a dedicated share of the software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants.

Figure 4:
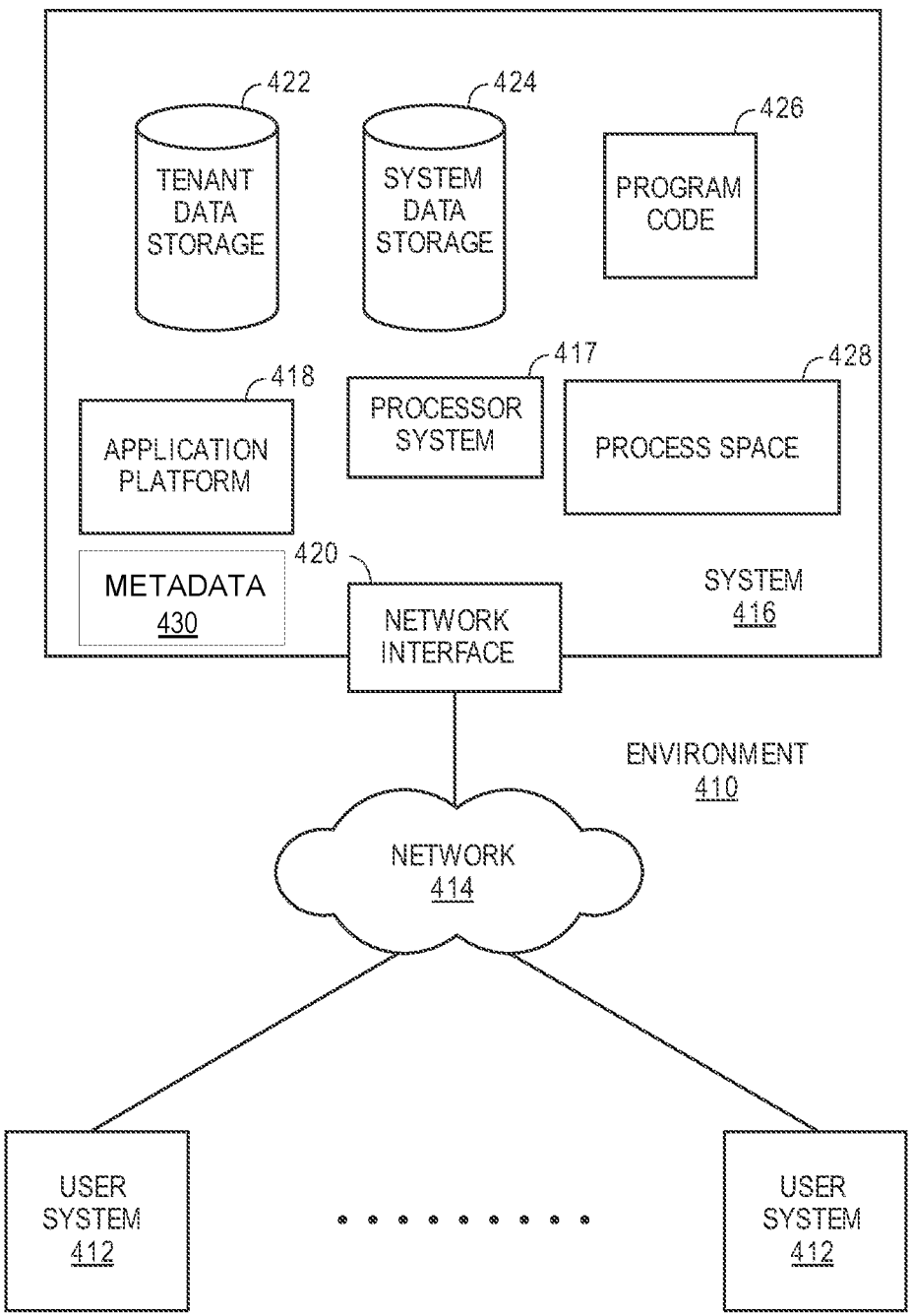
FIG. 4 illustrates a block diagram of an environment where an on-demand database service might be used.
Figure 5:
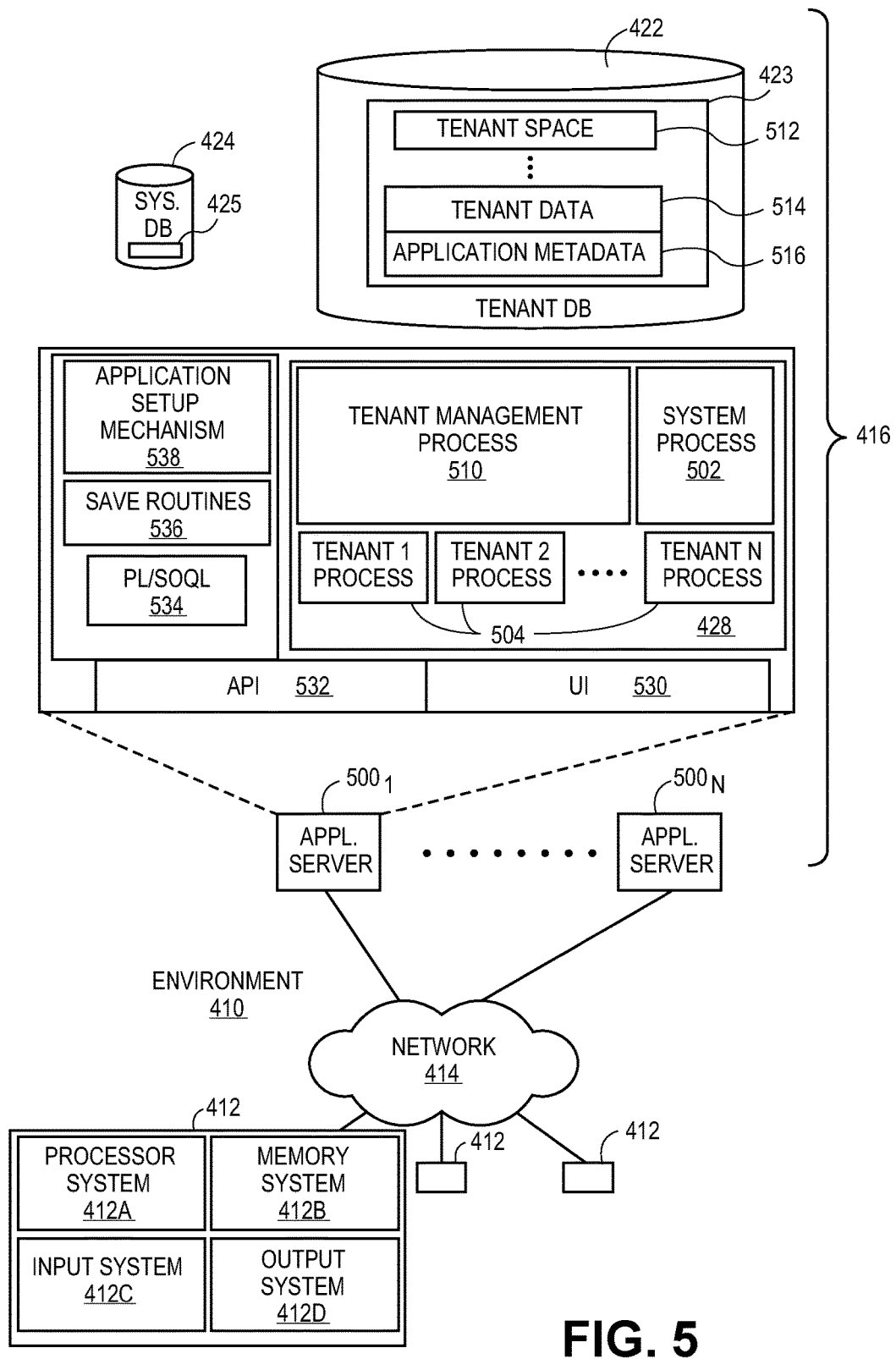
FIG. 5 illustrates a block diagram of an environment where an on-demand database service might be used.

In various embodiments, the environments described with respect to FIGS. 4 and 5 can provide the platform discussed with respect to FIG. 2.

FIG. 4 illustrates a block diagram of an environment 410 wherein an on-demand database service might be used. Environment 410 may include user systems 412, network 414, system 416, processor system 417, application platform 418, network interface 420, tenant data storage 422, system data storage 424, program code 426, and process space 428. In other embodiments, environment 410 may not have all of the components listed and/or may have other elements instead of, or in addition to, those listed above.

Environment 410 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices. As illustrated in herein FIG. 4 (and in more detail in FIG. 5) user systems 412 might interact via a network 414 with an on-demand database service, which is system 416. In one embodiment, system 416 utilizes metadata 430 as described herein.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 416" and "system 416" will be used interchangeably herein. A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 416 implements applications other than, or in addition to, a CRM application. For example, system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

One arrangement for elements of system 416 is shown in FIG. 4, including a network interface 420, application platform 418, tenant data storage 422 for tenant data 423, system data storage 424 for system data 425 accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4 include conventional, well-known elements that are explained only briefly here. For example, each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTP client, e.g., a browsing program, such as Edge from Microsoft, Safari from Apple, Chrome from Google, or a WAP-enabled browser in the case of a cell phone, PDA or other wireless device, or the like, allowing a user (e.g., subscriber of the multi-tenant database system) of user system 412 to access, process and view information, pages and applications available to it from system 416 over network 414. Each user system 412 also typically includes one or more user interface devices, such as a keyboard, a mouse, touch pad, touch screen, pen or the like, for interacting with a graphical user interface (GUI) provided by the browser on a display (e.g., a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Core series processor or the like. Similarly, system 416 (and additional instances of an MTS, where more than one is present) and all of their components might be operator configurable using application(s) including computer code to run using a central processing unit such as processor system 417, which may include an Intel Core series processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 5 also illustrates environment 410. However, in FIG. 5 elements of system 416 and various interconnections in an embodiment are further illustrated. FIG. 5 shows that user system 412 may include processor system 412A, memory system 412B, input system 412C, and output system 412D. FIG. 5 shows network 414 and system 416. FIG. 5 also shows that system 416 may include tenant data storage 422, tenant data 423, system data storage 424, system data 425, User Interface (UI) 530, Application Program Interface (API) 532, PL/SOQL 534, save routines 536, application setup mechanism 538, applications servers $500_1$-$500_N$, system process space 502, tenant process spaces 504, tenant management process space 510, tenant storage area 512, user storage 514, and application metadata 516. In other embodiments, environment 410 may not have the same elements as those listed above and/or may have other elements instead of, or in addition to, those listed above.

User system 412, network 414, system 416, tenant data storage 422, and system data storage 424 were discussed above in FIG. 4. Regarding user system 412, processor system 412A may be any combination of one or more processors. Memory system 412B may be any combination of one or more memory devices, short term, and/or long term memory. Input system 412C may be any combination of input devices, such as one or more keyboards, mice, trackballs, scanners, cameras, and/or interfaces to networks. Output system 412D may be any combination of output devices, such as one or more monitors, printers, and/or interfaces to networks. As shown by FIG. 5, system 416 may include a network interface 420 (of FIG. 4) implemented as a set of HTTP application servers 500, an application platform 418, tenant data storage 422, and system data storage 424. Also shown is system process space 502, including individual tenant process spaces 504 and a tenant management process space 510. Each application server 500 may be configured to tenant data storage 422 and the tenant data 423 therein, and system data storage 424 and the system data 425 therein to serve requests of user systems 412. The tenant data 423 might be divided into individual tenant storage areas 512, which can be either a physical arrangement and/or a logical arrangement of data. Within each tenant storage area 512, user storage 514 and application metadata 516 might be similarly allocated for each user. For example, a copy of a user's most recently used (MRU) items might be stored to user storage 514. Similarly, a copy of MRU items for an entire organization that is a tenant might be stored to tenant storage area 512. A UI 530 provides a user interface and an API 532 provides an application programmer interface to system 416 resident processes to users and/or developers at user systems 412. The tenant data and the system data may be stored in various databases, such as one or more Oracle™ databases.

Application platform 418 includes an application setup mechanism 538 that supports application developers' creation and management of applications, which may be saved as metadata into tenant data storage 422 by save routines 536 for execution by subscribers as one or more tenant process spaces 504 managed by tenant management process 510 for example. Invocations to such applications may be coded using PL/SOQL 534 that provides a programming language style interface extension to API 532. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 516 for the subscriber making the invocation and executing the metadata as an application in a virtual machine.

Each application server 500 may be communicably coupled to database systems, e.g., having access to system data 425 and tenant data 423, via a different network connection. For example, one application server $500_1$ might be coupled via the network 414 (e.g., the Internet), another application server $500_{N-1}$ might be coupled via a direct network link, and another application server $500_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 BIG-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also can be used. For example, in certain embodiments, three consecutive requests from the same user could hit three different application servers 500, and three requests from different users could hit the same application server 500. In this manner, system 416 is multi-tenant, wherein system 416 handles storage of, and access to, different objects, data and applications across disparate users and organizations.

As an example of storage, one tenant might be a company that employs a sales force where each salesperson uses system 416 to manage their sales process. Thus, a user might maintain contact data, leads data, customer follow-up data, performance data, goals and progress data, etc., all applicable to that user's personal sales process (e.g., in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 500 to request and update system-level and tenant-level data from system 416 that may require sending one or more queries to tenant data storage 422 and/or system data storage 424. System 416 (e.g., an application server 500 in system 416) automatically generates one or more SQL statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A non-transitory computer-readable medium having stored thereon instructions that, when executed by one or more processors, cause the one or more processors to:
    detect a change to metadata within a computing environment;
    log the change to metadata as an event in response to a trigger;
    decompile, in response to the detected change with one or more hardware computing components coupled with at least one physical memory device, metadata changes corresponding to the event into one or more source objects in a format compatible with a version control system (VCS), wherein decompiling corresponds to converting metadata within the computing environment to the source objects and the decompiled source object indicates the change to the metadata;
    store the source object in the VCS with relationship information to indicate a relationship to another source object corresponding to another metadata change, if the relationship is determined, wherein the VCS manages versions of the source objects;
    compile, in response to a version change request, at least one source object stored in the VCS to metadata corresponding to a previous change;
    deploy the metadata to an environment to restore metadata in the environment to a version prior to the previous change.

2. The non-transitory computer-readable medium of claim 1 wherein the format comprises one of a text file, a XML-compatible file, a programming language file, an APEX code compatible file.

3. The non-transitory computer-readable medium of claim 1 wherein the compiling is performed in response to a request from the computing environment.

4. The non-transitory computer-readable medium 1 wherein compiling is performed in response to a database trigger.

5. The non-transitory computer-readable medium of claim 4 wherein the trigger occurs in response to metadata file comparisons that are performed at pre-selected intervals.

6. The non-transitory computer-readable medium of claim 1 wherein the VCS provides relationship and dependency information in a storage structure to indicate relationships between decompiled files.

7. The non-transitory computer-readable medium of claim 1 wherein the VCS provides relationship and dependency information in versioning information to indicate relationships between decompiled files.

8. A method comprising:
    detecting a change to metadata within a computing environment;
    logging the change to metadata as an event in response to a trigger;
    decompiling, in response to the detected change with one or more hardware computing components coupled with at least one physical memory device, metadata changes corresponding to the event into one or more source objects in a format compatible with a version control system (VCS), wherein decompiling corresponds to converting metadata within the computing environment to the source objects and the decompiled source object indicates the change to the metadata;
    storing the source object in the VCS with relationship information to indicate a relationship to another source object corresponding to another metadata change, if the relationship is determined, wherein the VCS manages versions of the source objects; and
    compiling, in response to a version change request, at least one source object stored in the VCS to metadata corresponding to a previous change;
    deploying the metadata to an environment to restore metadata in the environment to a version prior to the previous change.

9. The method of claim 8 wherein the format comprises one of a text file, a XML-compatible file, a programming language file, an APEX code compatible file.

10. The method of claim 8 wherein the compiling is performed in response to a request from the computing environment.

11. The method of claim 8 wherein compiling is performed in response to a database trigger.

12. The method of claim 11 wherein the trigger occurs in response to metadata file comparisons that are performed at pre-selected intervals.

13. The method of claim 8 wherein the VCS provides relationship and dependency information in a storage structure to indicate relationships between decompiled files.

14. The method of claim 8 wherein the VCS provides relationship and dependency information in versioning information to indicate relationships between decompiled files.

15. A system comprising:
    a physical memory device;
    one or more processors coupled with the physical memory device, the one or more processors to detect a change to metadata within a computing environment, to log the change to metadata as an event in response to a trigger, decompile, in response to the detected change with one or more hardware computing components coupled with at least one physical memory device, metadata changes corresponding to the event into one or more source objects in a format compatible with a version control system (VCS), wherein decompiling corresponds to converting metadata within the computing environment to the source objects and the decompiled source object indicates the change to the metadata, and to store the source object in the VCS with relationship information to indicate a relationship to another source object corresponding to another metadata change, if the relationship is determined, wherein the VCS manages versions of the source objects, to compile, in response to a version change request, at least one source object stored in the VCS to metadata corresponding to a previous change, and to deploy the metadata to an environment to restore metadata in the environment to a version prior to the previous change.

16. The system of claim 15 wherein the format comprises one of a text file, a XML-compatible file, a programming language file, an APEX code compatible file.

17. The system of claim 15 wherein the compiling is performed in response to a request from the computing environment.

18. The system of claim 15 wherein compiling is performed in response to a database trigger.

19. The system of claim 18 wherein the trigger occurs in response to metadata file comparisons that are performed at pre-selected intervals.

20. The system of claim 15 wherein the VCS provides relationship and dependency information in a storage structure to indicate relationships between decompiled files.

21. The system of claim 15 wherein the VCS provides relationship and dependency information in versioning information to indicate relationships between decompiled files.

* * * * *